Aug. 30, 1938.   H. J. HEGAN   2,128,818
MANUFACTURE OF ARTIFICIAL THREADS, FILAMENTS, AND THE LIKE
Filed Oct. 3, 1935
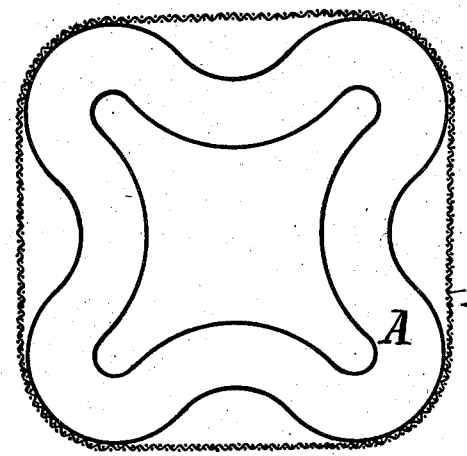
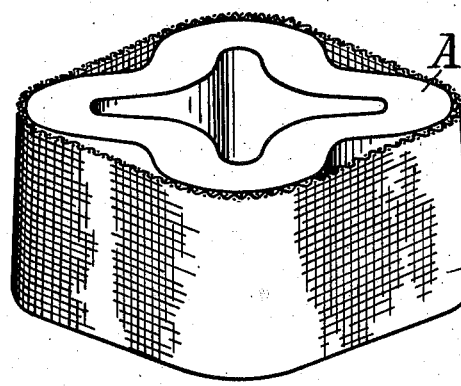
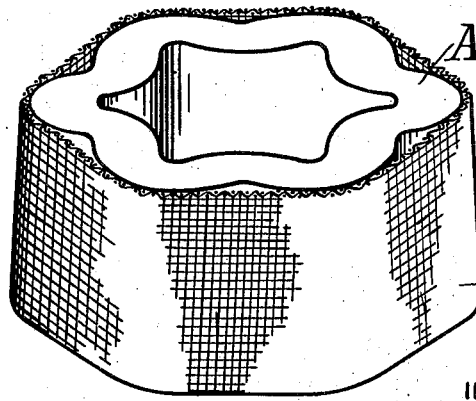
INVENTOR
HORACE JAMES HEGAN
by his attorneys
Howson and Howson Patented Aug. 30, 1938

2,128,818

UNITED STATES PATENT OFFICE 2,128,818

MANUFACTURE OF ARTIFICIAL THREADS, FILAMENTS, AND THE LIKE

Horace James Hegan, Coventry, England, assignor to Courtaulds Limited, London, England, a British company Application October 3, 1935, Serial No. 43,447
In Great Britain October 18, 1934

1 Claim. (Cl. 18—54)

In the specification of Letters Patent No. 1,736,681 it is stated that if a cake of artificial thread, as obtained by collecting the thread in a centrifugal spinning box, is washed and then dried while still in the annular form, the thread on the outside of the cake dries under a tension which is greater than that to which the thread on the inside of the cake is subjected, owing to the fact that the inside layers can contract readily while the outside layers do not have the same opportunity of contracting. The said specification No. 1,736,681 describes and claims the step of deforming the cake so that it is no longer annular in shape, but so that practically all parts of the threads in the cake are accorded free opportunity to contract on drying, without being subjected to undue tension.

I have now found that improved results are obtained if, to a cake which is deformed as described above, so that all parts of the threads in the cake are free to contract on drying without being subjected to undue tension, suitable flexible means are applied so that the cake is retained in the aforesaid deformed condition until after drying. For example, a band, tape or other wrapping may be placed or fastened round the deformed cake. I prefer to employ for wrapping or placing round the cake, a piece of cloth the width of which is the same as the depth of the cake, and this piece of cloth may be provided with any suitable fastener, as for example one or more press-studs, or it may be made in the form of an endless band, which slips over the end of the compressed and deformed cake. In either case it serves to retain the cake in a deformed state, and the effective length of the band is less than the original circumference of the cake before deformation. I also generally prefer to place this piece of cloth, or other means for retaining the cake in a deformed state, round the cake while it is still held by the deforming rods, for instance while it is in the position shown in either Figure 3 or Figure 6 of the drawing accompanying the said specification No. 1,736,681.

The accompanying drawing will serve to illustrate how this invention may be carried out in practice, but the invention is not restricted to the methods shown in the drawing.

Figure 1 shows in plan a deformed (radially indented or corrugated and compressed) cake with the piece of cloth round it, while Figures 2 and 3 show cakes, with their wrappings, in perspective. In each case, A is the deformed cake, and B the piece of cloth which is retaining the cake in its deformed state. In Figures 1 and 2, the cake is shown as having been deformed by means of four internal and four external rods in the manner illustrated in Figure 3 of the drawing accompanying the said specification No. 1,736,681, while in Figure 3, the cake is shown as having been deformed by means of six internal and six external rods.

What I claim is:—

In the manufacture of artificial threads, filaments, and the like, by the centrifugal process, in which a wet cake of circular cross section is produced, the method which comprises radially indenting or corrugating and compressing the cake, confining said radially indented or corrugated cake in an inclosure having at least one opening and having a perimeter smaller than the circumference of the cake prior to its indentation or corrugation and capable of preventing said cake from returning to its original circular in cross section shape, so that all parts of the thread in the cake are free to contract on drying without being subjected to undue tension, and removing at least a part of the water from the cake before said inclosure is removed from the cake.

HORACE JAMES HEGAN.